US012704267B2

(12) United States Patent
Schäfer et al.

(10) Patent No.: US 12,704,267 B2
(45) Date of Patent: Aug. 11, 2026

(54) CONTROL SYSTEMS FOR A HEAT NETWORK

(71) Applicant: Siemens Aktiengesellschaft, Munich (DE)

(72) Inventors: Jochen Schäfer, Nuremberg (DE); Sebastian Thiem, Neustadt an der Aisch (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 972 days.

(21) Appl. No.: 17/918,498

(22) PCT Filed: Feb. 10, 2021

(86) PCT No.: PCT/EP2021/053168

§ 371 (c)(1),
(2) Date: Oct. 12, 2022

(87) PCT Pub. No.: WO2021/209179

PCT Pub. Date: Oct. 21, 2021

(65) Prior Publication Data

US 2023/0147425 A1 May 11, 2023

(30) Foreign Application Priority Data

Apr. 14, 2020 (DE) ..................... 10 2020 204 682.4

(51) Int. Cl.
*F24D 19/10* (2006.01)
*G06Q 50/06* (2024.01)

(52) U.S. Cl.
CPC ......... *F24D 19/1048* (2013.01); *G06Q 50/06* (2013.01); *F24D 2200/13* (2013.01); *F24D 2200/32* (2013.01)

(58) Field of Classification Search
None
See application file for complete search history.

(56) References Cited

U.S. PATENT DOCUMENTS

2019/0257540 A1* 8/2019 Rosén .................... F24D 10/003
2020/0096205 A1* 3/2020 Rosén ...................... F24D 18/00
(Continued)

FOREIGN PATENT DOCUMENTS

DE 10 2015 107 214 11/2016 ............. F24D 10/00
DE 10 2017 125 282 5/2019 ............. F24D 19/10
(Continued)

OTHER PUBLICATIONS

Machine Translation EP3091294A1 (Year: 2026).*
(Continued)

*Primary Examiner* — Michael G Hoang
*Assistant Examiner* — Deepak A Deean
(74) *Attorney, Agent, or Firm* — Slayden Grubert Beard PLLC

(57) ABSTRACT

Various embodiments of the teachings herein include a control platform for controlling a heat network. A plurality of heat consumers and/or heat generators are coupled to the heat network for heat exchange. The control platform is programmed to: receive from each heat consumer information about a respective local feed temperature required as a minimum by the heat consumer within a time interval; and/or receive from each heat generator information about a respective local feed temperature that can be provided as a maximum by the heat generator within the time interval; and control the heat network depending on the received information relating to the local feed temperatures.

14 Claims, 1 Drawing Sheet

(56) References Cited

U.S. PATENT DOCUMENTS

| | | | | |
|---|---|---|---|---|
| 2020/0363072 | A1* | 11/2020 | Rosén | F24D 10/003 |
| 2020/0363074 | A1* | 11/2020 | Rosén | G06Q 10/063 |
| 2021/0036521 | A1 | 2/2021 | Chapotard | H02J 3/46 |
| 2021/0088227 | A1* | 3/2021 | Rosén | F24D 10/003 |
| 2021/0293417 | A1* | 9/2021 | Rosenqvist | F24D 10/003 |
| 2022/0243928 | A1* | 8/2022 | Rosén | F24F 5/0003 |
| 2022/0373211 | A1* | 11/2022 | Martellacci | F24F 11/65 |
| 2023/0213212 | A1* | 7/2023 | Lindoff | F24D 10/00 237/8 R |

FOREIGN PATENT DOCUMENTS

| | | | | |
|---|---|---|---|---|
| EP | 2 354 677 | | 8/2011 | F24D 10/00 |
| EP | 3091294 | A1 * | 11/2016 | F24D 11/001 |
| EP | 3 518 369 | | 7/2019 | H02J 3/46 |
| EP | 3 091 294 | | 11/2019 | F24D 10/00 |
| EP | 3 767 770 | | 1/2021 | H02J 3/06 |
| WO | WO-2007136344 | A1 * | 11/2007 | F24D 10/00 |

OTHER PUBLICATIONS

Search Report for International Application No. PCT/EP2021/053168, 12 pages, May 3, 2021.

Search Report for DE Application No. 10 2020 204 682.4, 7 pages, Sep. 16, 2021.

* cited by examiner

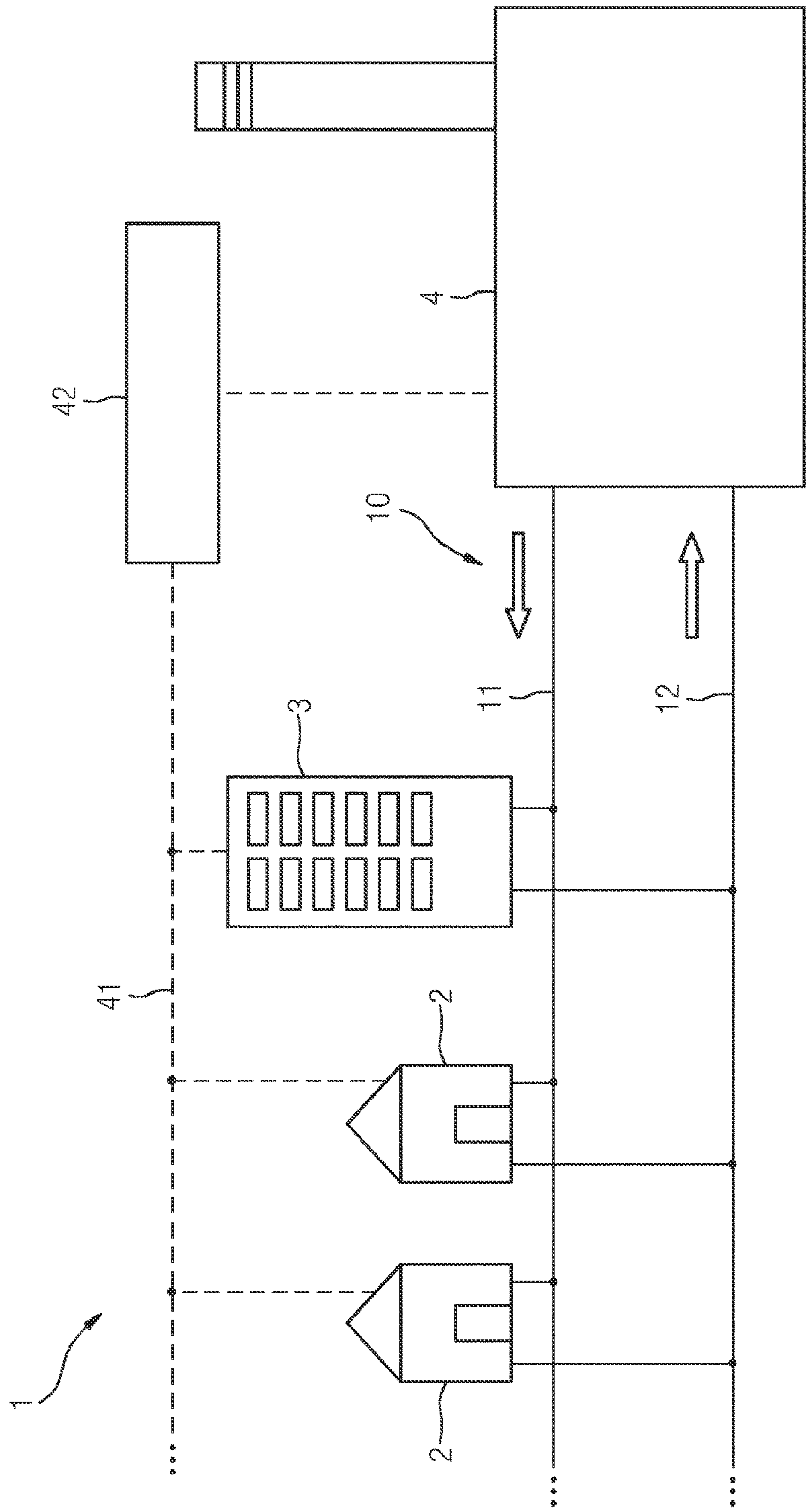
4
42
10
11
12
3
41
2
2
1

CONTROL SYSTEMS FOR A HEAT NETWORK

CROSS-REFERENCE TO RELATED APPLICATIONS

This application is a U.S. National Stage Application of International Application No. PCT/EP2021/053168 filed Feb. 10, 2021, which designates the United States of America, and claims priority to DE Application No. 10 2020 204 682.4 filed Apr. 14, 2020.

TECHNICAL FIELD

The present disclosure relates to heat networks. Various embodiments of the teachings herein may include control platforms, methods, and/or heat exchange systems.

BACKGROUND

Energy systems such as municipalities, homes, buildings, businesses and the like can be supplied with community heat or district heat. The district or community heat is typically delivered via a heat network of a heat generating facility central to the energy systems, e.g. a supplier of district or community heat. For example, a regional municipal utility is one such supplier of district or community heat. The central heat generating facility typically comprises gas boilers and/or combined heat and power plants for generating heat or providing heat.

The heat network that provides or distributes the generated heat to the energy systems typically has a feed at a feed temperature and a return at a return temperature for a heat transfer medium. Said heat transfer medium, typically water, circulates within the heat network and facilitates the transfer of the heat between the energy systems and the central heat generating facility. The heat network may have various structures and topologies, for instance a ring structure. The heat is transferred or exchanged between the heat network and each of the individual energy systems (heat consumers and/or heat generators) typically via an associated heat exchanger. Each energy system typically has a heat network that is internal to the energy system and is thermally coupled to the central heat network of the central heat generating facility via the heat exchanger.

In some examples, the heat supplier guarantees a set delivery temperature of the feed. Each member connected to the heat network (heat consumer and/or heat generator) must also cool the heat to a set return temperature. This is typically done by regulating the mass flow rate.

In some examples, the feed temperature of the heat network must be kept constant during operation of the heat network. A distinction is only made between winter and summer. This means, however, that the heat network is not operated at the best possible thermal efficiency over the whole year.

SUMMARY

The teachings of the present disclosure may be used to improve the thermal efficiency of a heat network. For example, some embodiments include a control platform (42) for controlling a heat network (10), in particular a community heat network and/or district heat network, wherein a plurality of heat consumers (2) and/or heat generators (3) are coupled to the heat network (10) for the purpose of heat exchange, characterized in that the control platform (42) is designed to: receive from each heat consumer (2) information about a local feed temperature required as a minimum by the heat consumer (2) within a time interval; and/or receive from each heat generator (3) information about a local feed temperature that can be provided as a maximum by the heat generator (3) within a time interval; and control the heat network (10) depending on the received information relating to the local feed temperatures.

In some embodiments, the control platform (42) is designed to adjust a, in terms of the heat network (10), global feed temperature and/or global return temperature of the heat network (10) depending on the information received about the local feed temperatures.

In some embodiments, the control platform (42) is designed to receive from each heat consumer (2) and/or heat generator (3) a heating power that can be consumed, or respectively provided, as a maximum within the time interval, wherein the control platform (42) can take the received maximum heating powers into account in controlling the heat network (10).

In some embodiments, the control platform (42) is designed to receive from each heat consumer (2) a maximum remuneration for a heat consumption within the time interval, wherein the control platform (42) takes the received maximum remunerations into account in controlling the heat network (10).

In some embodiments, the control platform (42) is designed to receive from each heat generator (3) a minimum remuneration for heat provision within the time interval, wherein the control platform (42) can take the received minimum remunerations into account in controlling the heat network (10).

In some embodiments, the control platform (42) is designed to calculate the value of the global feed temperature by means of mathematical optimization, wherein the control platform (42) can take at least the received local feed temperatures into account in the optimization.

In some embodiments, the control platform (42) is designed to adjust the global feed temperature of the heat network (10) in the range 30 degrees Celsius to 150 degrees Celsius.

In some embodiments, the control platform (42) is designed to perform a simulation of the operation of the heat network (10) on the basis of technical characteristic data of pipelines of the heat network (10).

In some embodiments, the control platform (42) is designed to perform the simulation on the basis of loss coefficients and/or maximum thermal powers and/or the positions of the heat consumers (2) within the heat network (10) and/or the positions of the heat generators (3) within the heat network (10).

As another example, some embodiments may include a method for controlling a heat network (10), in particular a community heat network and/or district heat network, by means of a control platform (42), wherein a plurality of heat consumers (2) and/or heat generators (3) are coupled to the heat network (10) for the purpose of heat exchange, characterized in that the control platform (42): receives from each heat consumer (2) information about a local feed temperature required as a minimum by the heat consumer (2) within a time interval; and/or receives from each heat generator (3) information about a local feed temperature that can be provided as a maximum by the heat generator (3) within a time interval; and controls the heat network (10) depending on the received information relating to the local feed temperatures.

In some embodiments, the control platform (42) adjusts a, in terms of the heat network (10), global feed temperature and/or global return temperature of the heat network (10) depending on the information received about the local feed temperatures.

In some embodiments, the control platform (42) receives from each heat consumer (2) and/or heat generator (3) a heating power that can be consumed, or respectively provided, as a maximum within the time interval, wherein the control platform (42) takes the received maximum heating powers into account in controlling the heat network (10).

As another example, some embodiments include a heat exchange system (1), characterized in that the heat exchange system (1) comprises a control platform (42) and a heat network (10), and the control platform (42) is designed to control the heat network (10), wherein a plurality of heat consumers (2) and/or heat generators (3) are coupled to the heat network (10), characterized in that the control platform (42) is designed to: receive from each heat consumer (2) information about a local feed temperature required as a minimum by the heat consumer (2) within a time interval; and/or receive from each heat generator (3) information about a local feed temperature that can be provided as a maximum by the heat generator (3) within a time interval; and control the heat network (10) depending on the received information relating to the local feed temperatures.

In some embodiments, the heat network (10) is in the form of a community heat network, district heat network, district cooling network and/or anergy network.

In some embodiments, the heat exchange system (1) comprises the heat consumers (2) and/or the heat generators (3).

BRIEF DESCRIPTION OF THE DRAWINGS

Further advantages, features, and details of the teachings herein appear in the exemplary embodiments described below and follow from the drawing, in which the single figure shows a heat exchange system incorporating teachings of the present disclosure. The same reference signs may be given to similar, equivalent or functionally identical elements.

DETAILED DESCRIPTION

The present disclosure teaches various systems and/or methods for controlling a heat network. Some embodiments of the teachings herein include a control platform for controlling a community heat network and/or district heat network, wherein a plurality of heat consumers and/or heat generators are coupled to the heat network for the purpose of heat exchange, is characterized in that the control platform is designed to: receive from each heat consumer information about a local feed temperature required as a minimum by the heat consumer within a time interval; and/or receive from each heat generator information about a local feed temperature that can be provided as a maximum by the heat generator within a time interval; and control the heat network depending on the received information relating to the local feed temperatures.

Here the term "control" includes closed-loop control. Thus the control platform may comprise a closed-loop control platform.

In some embodiments, the control platform forms a central coordination platform for the heat network, in particular for a district heat network and/or community heat network. The heat transferred to the heat consumers by the heat network may be generated or provided by a central heat generating facility, for example a combined heat and power plant. The control platform may be part of the central heat generating facility. In some embodiments, the control platform according to the invention is independent of the central heat generating facility and forms a local heat market in the sense of a local energy market, in particular a local district heating market and/or community heating market. This results in a local heat exchange that better harmonizes the heat generation and heat consumption. In some embodiments, the control platform is an essential element of such a local heat market. In other words, a local energy market in the sense of the present disclosure comprises one or more of the control platforms as described herein.

The members (heat consumers and/or heat generators) of the heat network are centrally coordinated by a control platform incorporating teachings of the present disclosure. For this purpose, the members, i.e. the heat consumers and/or heat generators, preferably have a device for exchanging data with the control platform, i.e. an IT link to the control platform. The control platform, by virtue of the control that it provides, in particular makes it possible to incorporate the heat generators into the heat network. As a result, local heat can be fed into the heat network. It is also possible to incorporate heat stores, which are regarded as heat consumers but can also provide heat in a similar way to heat generators.

In some embodiments, the control platform is designed to control the heat network on the basis of, i.e. depending on, the local feed temperatures conveyed to, and received by, the control platform. In particular, this may be done by adjusting the global feed temperature, i.e. the feed temperature of the heat network. In other words, the control by the control platform also takes account of the feed temperatures of the heat consumers and/or of the heat generators. As a result, the global feed temperature can be lowered or raised based on demand, thereby increasing the thermal efficiency of the heat network, i.e. the efficiency of providing heat. In particular, the demand-based adjustment of the global feed temperature may reduce the heat loss from the heat network to its surroundings, because the global feed temperature can be reduced, resulting in a smaller temperature difference with respect to the surroundings of the heat network.

In this process, the control platform incentivizes refraining from unnecessarily high feed temperatures. In addition, it encourages the use of thermal energy stores, in particular heat stores, to delay high-temperature thermal loads required on the heat consumption side in order to allow the global feed temperature to be reduced for as long a time as possible. For example, one of the heat generators first generates heat at 100 degrees Celsius by means of a gas burner. A heat consumer, which has a high temperature heat pump and a heat store, stores for later use the heat generated by the gas burner.

The methods incorporating teachings of the present disclosure for controlling a heat network, in particular a community heat network and/or district heat network, by means of a control platform, wherein a plurality of heat consumers and/or heat generators are coupled to the heat network for the purpose of heat exchange, is characterized in that the control platform: receives from each heat consumer information about a local feed temperature required as a minimum by the heat consumer within a time interval; and/or receives from each heat generator information about a local feed temperature that can be provided as a maximum by the heat generator within a time interval; and controls the heat network depending on the received information relating to the local feed temperatures.

The heat exchange system incorporating teachings of the present disclosure is characterized in that the heat exchange system comprises a control platform and a heat network, and the control platform is designed to control the heat network, wherein a plurality of heat consumers and/or heat generators are coupled to the heat network for the purpose of heat exchange, which control platform is designed to: receive from each heat consumer information about a local feed temperature required as a minimum by the heat consumer within a time interval; and/or receive from each heat generator information about a local feed temperature that can be provided as a maximum by the heat generator within a time interval; and control the heat network depending on the received information relating to the local feed temperatures.

In some embodiments, the control platform is designed to adjust a, in terms of the heat network, global feed temperature and/or global return temperature of the heat network depending on the information received about the local feed temperatures. In other words, the feed temperature of the heat network (global feed temperature) and/or the return temperature of the heat network (global return temperature) is raised or lowered on the basis of the local feed temperatures of the individual heat consumers and/or heat generators.

It may be advantageous here to lower the global feed temperature as far as possible while still sufficiently covering the heat demand of the heat consumers. In other words, as low a feed temperature as possible of the heat network is advantageous because the heat can be provided more efficiently thereby. For example, heat generation by a high temperature heat pump is more efficient at low feed temperatures because its coefficient of performance is higher. In the case of a gas boiler, the fuel utilization efficiency is higher.

In some embodiments, allows such a low global feed temperature, in particular on the part of the heat consumers, while at the same time covering the heat demand of the heat consumers. This is made possible by the fact that the control platform knows the local feed temperatures, i.e. the feed temperatures of the heat consumers. It is thereby possible to provide comprehensive control of the heat network in a manner that takes account of the local feed temperatures while allowing as great a reduction as possible in the feed temperature of the heat network (global feed temperature). In other words, the plurality of members, in particular of a community heat network and/or district heat network, can be coordinated centrally by the control platform.

In some embodiments, the control platform is designed to receive from each heat consumer and/or heat generator a heating power that can be consumed as a maximum, or respectively provided as a maximum, within the time interval, wherein the control platform can take the received maximum heating powers into account in controlling the heat network.

In other words, the heat consumers notify the control platform of their maximum heat demand within the time interval. The heat generators notify the control platform of the maximum heating power that they can provide and/or generate within the time interval. In particular this is done for a future time interval, for example for the next hour or the next 15 minutes, and is repeated in the stated time periods. The control platform thereby knows about the thermal loads required in the future (within the time interval). The control platform takes this information into account in the control, in particular the adjustment or setting of the global feed temperature, i.e. of the feed temperature of the heat network. This advantageously further improves the control.

In some embodiments, the control platform is designed to receive from each heat consumer a maximum remuneration for a heat consumption within the time interval, wherein the control platform takes the received maximum remunerations into account in controlling the heat network.

In some embodiments, the heat consumers notify the control platform of the maximum remuneration for which they are prepared to draw or consume heat (within the time interval) from the heat network. The control platform takes into account in its control of the heat network this conveyed information, which it receives and, if applicable, processes. In particular, it links for each heat consumer its conveyed maximum heating h power to its conveyed associated maximum remuneration. In other words, the control platform knows for the time interval and for each heat consumer its local feed temperature, its maximum heating power and its maximum remuneration therefor. This can be understood to be an offer to the control platform in the sense of a heat market platform. As part of the control, the control platform harmonizes the heating powers with the respective remunerations (remuneration conditions). In other words, it matches these. The local feed temperatures and additionally determined network segments of the heat network can be taken into account here. Taking into account network segments of the heat network requires at least modeling of the heat network.

For the heat generators, the procedure can be similar to that for the above-described heat consumers, although in this case they convey a minimum remuneration for providing their heating power. In other words, the control platform may be designed to receive from each heat generator a minimum remuneration for heat provision within the time interval, wherein the control platform can take the received minimum remunerations into account in controlling the heat network. In some embodiments, they are similar to the heat consumers, although unlike the heat consumers, the heat generators convey to the control platform a minimum remuneration for the thermal load they are to provide.

In some embodiments, the control platform is designed to calculate the value of the global feed temperature by means of mathematical optimization, wherein the control platform can take at least the received local feed temperatures into account in the optimization. In other words, the heat network is controlled on the basis of, or by means of, mathematical optimization. In this process, the mathematical optimization is based on an optimization parameter, which is also called an objective function. The optimization is used to determine, obtain and/or calculate variables of the optimization parameter, for instance the individual thermal loads, that form a maximum or minimum value of the optimization parameter (objective function value). The optimization parameter is, in particular, a technical parameter of the heat network, for instance its thermal turnover, which is meant to be maximized, or the global feed temperature, which is meant to be minimized. The current status of the heat network, which status is characterized by the local feed temperatures, is taken into account in the optimization. For example, these are used for parameterizing the objective function.

In some embodiments, the control platform is designed to adjust the global feed temperature of the heat network in the range 30 degrees Celsius to 150 degrees Celsius. This improves the efficiency of the heat network by allowing low feed temperatures.

In particular, the specified temperature range is taken into account in the optimization as a constraint. It is possible to distinguish between the seasons here. In winter, a global feed temperature up to 150 degrees Celsius, in particular up to 130 degrees Celsius, or up to a maximum of 120 degrees Celsius. In summer, a global feed temperature in the range 30 degrees Celsius to 100 degrees Celsius, in particular in the range 40 degrees Celsius to 90 degrees Celsius, or in the range 40 degrees Celsius to 80 degrees Celsius.

In some embodiments, the control platform is designed to perform a simulation of the operation of the heat network on the basis of technical characteristic data of pipelines of the heat network. This may further improve the control of the heat network by the control platform, in particular with regard to taking into account network segments of the heat network.

In some embodiments, for the purpose of taking into account network segments of the heat network, the control platform may be designed to perform the simulation on the basis of loss coefficients and/or maximum thermal powers and/or the positions of the heat consumers within the heat network and/or the positions of the heat generators within the heat network.

In some embodiments, it is possible to take account of differences in the network segments of the heat network, in particular with regard to technical characteristic data such as different pipe diameters, loss coefficients and/or transfer capacities (maximum thermal powers). This may further improve the control of the heat network.

In some embodiments, the heat network is in the form of a community heat network, district heat network, district cooling network and/or anergy network. In some embodiments, the heat network is a community heat network or a district heat network. A large proportion of pre-existing heat networks can hence be integrated in a heat exchange system.

In some embodiments, the heat exchange system comprises the heat consumers and/or the heat generators.

The heat exchange system 1 comprises at least one control platform 42 incorporating teachings of the present disclosure, and at least one heat network 10. A plurality of heat networks 10 may be provided.

The heat network 10 is intended, or designed, to couple thermally for the purpose of heat exchange, one or more heat consumers 2 and/or one or more heat generators 3. For the purpose of general heat provision or heat generation is also provided a heat generating facility 4 central to the heat network 10. Thus the heat consumers 2 can obtain via the heat network 10 heat generated by the heat generating facility 4 and/or fed in by the heat generators 3. Further heat consumers 2, in particular heat stores, and/or heat generators 3 and an associated continuation of the thermal network 10 (heat network) are indicated in the figure by three dots in succession.

For the supply to the heat consumers 2 and for the feed-in by the heat generators 3, the heat network 10 has a feed 11 and a return 12 for a heat transfer medium, typically water. The heat network 10 is typically formed by pipelines, through which the heat transfer medium flows from the feed to the return at a certain mass flow rate. The feed 11 of the heat network 10 has a feed temperature, which is referred to as the global feed temperature to distinguish it from local feed temperatures of the heat consumers 2 and/or heat generators 3. The return 12 of the heat network 10 has a return temperature, which is correspondingly referred to as the global return temperature.

The local feed temperatures of the heat consumers 2 and/or of the heat generators 3 are typically formed by a local heat network of the heat consumers 2 and heat generators 3 respectively. In other words, the heat consumers 2 and/or the heat generators 3 each comprise a local heat network each having an associated local feed temperature. The thermal coupling between the (global) heat network 10 and said local heat networks is typically achieved by heat exchangers.

In some embodiments, the control platform 42 is designed to control the heat network 10. In particular, the term "control" is understood to mean adjustment of the (global) feed temperature of the heat network 10 and/or adjustment of the mass flow rate of the heat transfer medium within the heat network 10. The control platform 42 may be part of the central heat generating facility 4. In the figure, the control platform 42 is not part of the central heat generating facility 4.

In some embodiments, the control platform 42 is designed to receive from each of the heat consumers 2 and/or from each of the heat generators 3 information about their respective local feed temperatures required within a time interval, in particular within a coming or next time interval. In other words, the heat consumers 2 and/or the heat generators 3 convey said information, i.e. their intended (local) feed temperature, to the control platform 42. In this context, the heat consumers 2 convey a minimum feed temperature sufficient to cover the respective thermal loads, and the heat generators 3 convey a maximum feed temperature for the heating power that can be provided. The heat consumers 2 and/or the heat generators 3 can determine and/or convey their intended feed temperature by an associated energy management system and/or by edge devices, for example on the basis of a prediction calculated thereby of the heating power or amount of heat required within the time interval.

The control platform 42 controls the heat network 10 depending on the received information relating to the local feed temperatures. In some embodiments, the feed temperature of the heat network 10 is adjusted depending on the conveyed local feed temperatures required. An adjustment to as low a feed temperature as possible while at the same time covering the demand, which demand is known to the control platform 42 by virtue of the data/information conveyed by the heat consumers 2 and/or heat generators 3. In other words, the control platform 42 controls the heat network 10 preferably in such a way that the global feed temperature is minimized while taking into account the required local feed temperatures. The control platform 42 here is preferably designed for such control.

The information or data relating to the local feed temperatures of the heat consumers 2 and/or heat generators 3 can be transferred to the control platform 42 by means of a data network 41, in particular via the Internet, for instance in a cloud-based manner. In the figure, the dashed lines are used as a simplified representation of this data exchange, or of the associated data network 41. In addition, in particular if it is not part of the central heat generating facility 4, the control platform 42 can be coupled to the central heat generating facility 4 for the purpose of data exchange. In this case, the central heat generating facility 4 conveys in particular the global feed temperature and/or global return temperature of the heat network 10 to the control platform 42, which receives this information/data, and takes it into account in the control of the heat network 10.

The heat network 10 may be in the form of a community heat network, district heat network, district cooling network and/or anergy network. The heat network 10 may comprise a plurality of the various heat networks mentioned.

The teachings of the present disclosure thus allow, in particular for a community heat network or district heat network, coordination of a plurality of heat consumers, in particular heat stores, and heat generators, wherein the control platform takes the respective local feed temperatures into account in said coordination.

Although the teachings of the disclosure has been illustrated and described in detail using the exemplary embodiments, the scope of the disclosure is not limited by the examples, and a person skilled in the art can derive other variations therefrom without departing from the scope of protection.

LIST OF REFERENCE SIGNS

1 heat exchange system
2 heat consumer/heat generator
3 heat generator
4 central heat generating facility (CHP facility)
10 heat network
11 feed
12 return
41 data connection
42 control platform

What is claimed is:

1. A control platform for controlling a heat network, wherein a plurality of heat consumers and/or heat generators (3) are coupled to the heat network for heat exchange, the control platform comprising a processor programmed to:

receive from each heat consumer information about a respective local feed temperature required as a minimum by the heat consumer within a time interval; and/or receive from each heat generator information about a respective local feed temperature that can be provided as a maximum by the heat generator within the time interval; and control the heat network depending on the received information relating to the local feed temperatures.

2. The control platform as claimed in claim 1, wherein the control platform is further programmed to adjust a global feed temperature and/or global return temperature of the heat network depending on the information received about the local feed temperatures.

3. The control platform as claimed in claim 1, wherein the control platform is further programmed to:

receive from each heat consumer and/or heat generator a heating power that can be consumed, or respectively provided, as a maximum within the time interval; and take the received maximum heating powers into account in controlling the heat network.

4. The control platform as claimed in claim 1, wherein the control platform is further programmed to:

receive from each heat consumer a maximum remuneration for a heat consumption within the time interval; and take the received maximum remunerations into account in controlling the heat network.

5. The control platform as claimed in claim 1, wherein the control platform is further programmed to:

receive from each heat generator a minimum remuneration for heat provision within the time interval; and take the received minimum remunerations into account in controlling the heat network.

6. The control platform as claimed in claim 1, wherein the control platform is further programmed to:

calculate the value of the global feed temperature by means of mathematical optimization; and take at least the received local feed temperatures into account in the optimization.

7. The control platform as claimed in claim 1, wherein the control platform is further programmed to adjust the global feed temperature of the heat network in a range of 30 degrees Celsius to 150 degrees Celsius.

8. The control platform as claimed in claim 1, wherein the control platform is programmed to perform a simulation of the operation of the heat network based on technical characteristic data of pipelines of the heat network.

9. The control platform as claimed in claim 8, wherein the control platform is further programmed to perform the simulation on the basis of loss coefficients and/or maximum thermal powers and/or the positions of the heat consumers within the heat network and/or the positions of the heat generators within the heat network.

10. A method for controlling a heat network using a control platform, wherein a plurality of heat consumers and/or heat generators are coupled to the heat network for heat exchange, the method comprising:

receiving from each heat consumer information about a respective local feed temperature required as a minimum by the heat consumer within a time interval; and/or receiving from each heat generator information about a respective local feed temperature that can be provided as a maximum by the heat generator within a time interval; and controlling the heat network based on the received information relating to the local feed temperatures.

11. The method as claimed in claim 10, further comprising adjusting a global feed temperature and/or global return temperature of the heat network based on the information received about the local feed temperatures.

12. The method as claimed in claim 10, further comprising:

receiving from each heat consumer and/or heat generator a heating power that can be consumed, or respectively provided, as a maximum within the time interval; and taking the received maximum heating powers into account in controlling the heat network.

13. A heat exchange system comprising:

a control platform; and a heat network;

wherein the control platform controls the heat network;

a plurality of heat consumers and/or heat generators coupled to the heat network;

wherein the control platform is programmed to:

receive from each heat consumer information about a respective local feed temperature required as a minimum by the heat consumer within a time interval; and/or receive from each heat generator information about a respective local feed temperature that can be provided as a maximum by the heat generator within the time interval; and control the heat network based on the received information relating to the local feed temperatures.

14. The heat exchange system as claimed in claim 13, wherein the heat network comprises a community heat network, district heat network, district cooling network, and/or anergy network.

* * * * *